Sept. 27, 1949.    F. CLARK    2,482,902

CHOKE COIL

Filed Jan. 24, 1946

*INVENTOR.*
FRANKLIN CLARK
BY
ATTORNEY

Patented Sept. 27, 1949

2,482,902

UNITED STATES PATENT OFFICE 2,482,902

CHOKE COIL

Franklin Clark, Chatham, N. J., assignor to Hanovia Chemical & Manufacturing Company, Newark, N. J., a corporation of New Jersey Application January 24, 1946, Serial No. 643,164

3 Claims. (Cl. 171—242)

This invention relates to electrical components and is concerned in particular with the provision of hermetically sealed electrical components.

Electrical components, such for example as choke coils, when exposed to adverse atmospheric conditions are apt to deteriorate unless properly protected against humidity, fungi, corrosion, etc. Also the electrical component must maintain its electrical characteristics throughout its useful life without any change, notwithstanding such adverse atmospheric conditions as might be encountered for instance at sea, in the form of saline air, or in the tropics in the form of hot moist air. At the same time such components must be capable of being manufactured easily and must have a sufficiently rugged structure to withstand mechanical shocks or the like.

It is one object of this invention to provide an electrical component which shall be hermetically sealed within a protective housing. It is another object of this invention to provide such sealed-in electrical component which shall be effectively protected against humidity, fungi, corrosion and other harmful and deleterious influences and effects. Other objects and advantages of my invention will appear from the description thereof hereafter following.

Figure 1:
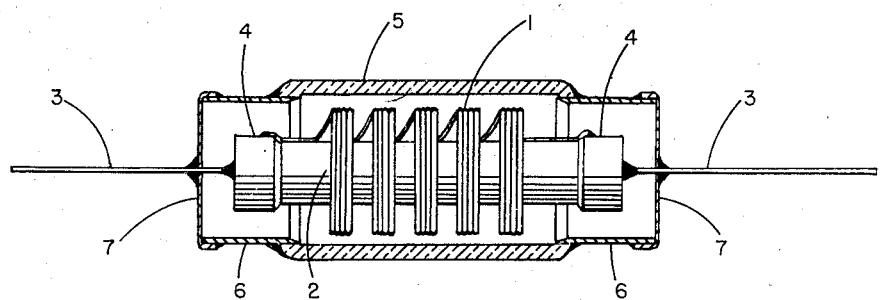
Figure 2:
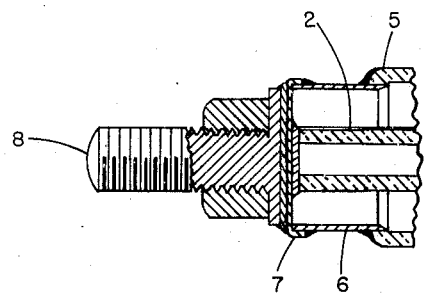
Figure 3:
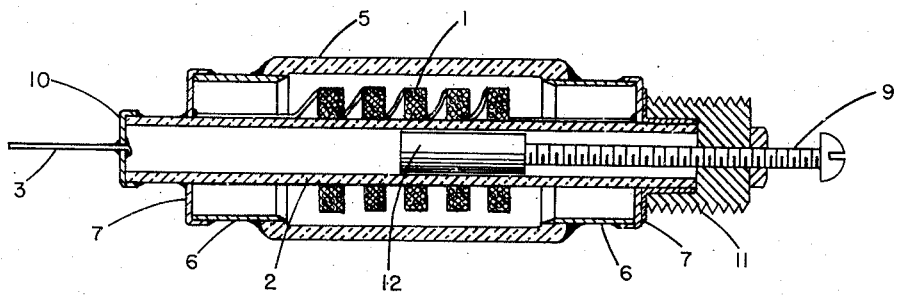

The nature of my invention and the construction of the hermetically sealed electrical component of the invention are illustrated in the accompanying drawings forming part hereof in which Figure 1 represents a longitudinal sectional view of one embodiment of the invention, and Figure 2 represents a longitudinal sectional view of one end of the embodiment of Figure 1 in modified form, and Figure 3 represents a longitudinal sectional view of another embodiment of the invention.

In the drawings I have illustrated in particular a sealed-in choke coil although it will be understood that the invention is likewise applicable to other sealed-in electrical components such for instance as resistors, capacitors, suppressors, transformers, relays, etc., as well as combinations of electrical components.

Referring to the drawings, a choke coil 1 is wound on an electrically non-conductive core or support 2 of ceramic or vitreous or the like material and is connected to leads 3, e. g. copper pigtail leads, the connections being either direct or, as shown in Figure 1, by way of intermediate connectors 4, e. g. of brass, which may be in the form of caps mounted on the support 2 at the ends thereof. The choke coil assembly is provided within a housing 5, preferably in the form of an elongated envelope, and is sealed thereto by means of a tubular ring 6 and end cap closure 7. The housing 5 may consist of any suitable electrically non-conductive material, e. g. vitreous material, for example glass, or suitable plastics and the tubular ring 6 and terminal cap 7 may consist of any suitable metal, so long as the material of the envelope 5 and the metal of the tubular ring 6 have approximately the same temperature coefficient of expansion. Thus for instance I may use for the construction of the envelope 5 such glasses as are commonly known as Nonex or Corning #7052 in combination with a metal ring 6 constructed of such metal composition as is commonly known as Kovar or Fernico. It is one particular feature of this invention that the tubular annulus 6 is of smaller cross-section than the open end of the tubular glass envelope 5 so that such ring fits into the tubular glass envelope. In the manufacture of the complete sealed electrical component I first seal the ends of the glass envelope directly to the metal ring, then insert the choke coil or other electrical component into the envelope, place the terminal cap closures in position and finally secure such terminal caps to the metal ring and to the leads-in in any suitable manner, e. g. soldering, welding or the like, adapted to provide an integral, hermetic bond.

It will be observed that in the final assembly the metal ring 6 is projected within the envelope 5 and that consequently its outside diameter equals or is slightly less than the inside diameter of the tubular envelope at least at the ends thereof, and that the terminal cap 7 encompasses the other end of the metal ring on the outside and serves at the same time as support for the sealed-in electrical component. Since the metal ends—comprising the ring 6 and the terminal caps 7—are smaller in diameter than the tubular glass envelope the entire sealed component may be strapped to a metal chassis without short-circuiting such metal ends through the chassis, thus facilitating the mounting of such components as compared with other sealed in components of different construction.

The tubular ring 6 may be a section of a hollow tube having a circular, elliptical, square, or other suitable cross-section, and the end of the housing 5 will correspond, at least after the sealing operation, to the shape of such tubular ring, the housing encompassing part of such ring on its outside.

The structure of the sealed-in electrical component as described was developed in an effort to provide a sealed-in electrical component hermetically sealed against deleterious ambient atmospheric conditions. With such construction it is possible for instance to provide a direct seal of metal and glass, which requires the employment of elevated temperatures, for electrical components which are either incapable of withstanding such elevated temperatures or are sensitive thereto. For instance, many electrical components are wound with wire which is insulated with cotton or silk and held in place with wax or the like, and the employment of elevated temperatures, such as are necessarily involved in the making of a glass to metal seal, would melt the wax and burn the insulation material. In the sealed-in electrical component in accordance with the invention I provide the desirable glass to metal seal prior to the insertion of the electrical component itself within the housing, so that the production of the glass to metal seal—involving the sealing of the ends of the envelope 5 to the metal rings 6 at a temperature of from 500° C. to 800° C.—takes place in the absence of the heat-sensitive electrical component, and the remaining heat operations taking place in proximity to the electrical component, i. e. the soldering of the terminal cap 7 to the metal ring 6 and the leads 3 can be carried out at sufficiently low temperatures, e. g. 150° C. to 325° C., and at a distance sufficiently removed from the electrical component itself, so that absence of any heat damage to the component is fully assured.

The construction of the component in accordance with the invention lends itself to various useful modifications not possible with structures of the prior art. Thus for instance as shown in Figure 2 either or both ends of the component may be provided with a threaded bolt 8 soldered to the end cap 7 in place of the pigtail lead 3 shown in Figure 1, either as a feature in mounting the electrical component or for use as a terminal.

The hermetically sealed-in choke coil produced in accordance with the invention is further characterized by extremely low electrical capacity, since the construction requires the use of little metal only for the terminal ring 6 and the closure 7, so that the capacity between the metal end pieces is negligible.

Figure 3 of the drawings illustrates another embodiment of the hermetically sealed-in electrical component of the invention, again in the form of a choke coil. In this case the support 2 is in the form of a tubular sleeve on which the choke coil 1 is mounted as in the embodiment of Figure 1. The tubular sleeve 2 extends through the end caps 7 at both ends and is held in position thereby. As in the embodiment of Figure 1 the elongated envelope 5 is sealed directly to the metal ring 6 before the insertion of the electrical component itself. Thereafter the terminal closure caps 7 are soldered or otherwise hermetically secured to the rings 6 and to the tubular sleeve 2, for which purpose the sleeve or support 2 of vitreous or ceramic or the like electrically nonconductive material, is provided with a metal deposit from its terminal end to the junction between the closure cap 7 and the tubular sleeve or at least at such junction. Such metal deposit can be provided in any suitable manner as for instance by metallizing the surface of the sleeve 2.

Within the tubular support 2 I provide an iron core 12 of short length adapted to be moved along the length of the sleeve at least from one end of the coil 1 past the mid-point of said coil, in order to vary and regulate the inductance of the choke coil. The longitudinal movement of the iron inductance regulator 12 is effected by means of the threaded rotatable bolt 9 passing through the threaded terminal bushing or bearing 11 which encompasses the projecting end of the tubular sleeve 2 and is secured to such sleeve and to the terminal cap 7, e. g. by soldering. The terminal bushing 11 may also be threaded on the outside, so that it may serve as a mounting or terminal similar to the bolt 8 of Figure 2. The tubular sleeve may be closed at the other end by means of end cap 10 to which the lead 3 may be connected. If the end cap 10 and the bushing 11 are secured to the tubular sleeve by means of soldering, welding or the like it is advisable to again utilize an initial metal deposit on the tubular sleeve as in the case of the connection between the closure caps 7. The electrical connection between the choke coil 1 and the terminal lead 3 and the threaded bushing lead 11 may be provided in any suitable manner, for instance, as shown in Figure 3, by way of connection through the metallized ends of the sleeve 2.

It will be seen that I have thus provided an extremely simple and yet rugged sealed-in electrical component wherein the component itself is protected against any deleterious outside atmospheric influences by being hermetically sealed within a protecting envelope involving the utilization of a direct glass to metal seal, without interposed bonding layer, and that such hermetically sealed-in electrical component is provided without affecting the characteristics and efficiency of the electrical component which otherwise in the case of a direct metal to glass seal would be harmfully affected by the elevated temperatures required in the construction of such seal, and that such hermetically sealed-in electrical component can be provided even in adjustable form.

What I claim is:

1. A sealed-in choke coil comprising in combination a protective glass housing, a closure mounting at each end of said glass housing comprising a tubular metal ring having approximately the same coefficient of expansion as the glass housing and being sealed directly to said glass housing at the inside thereof, the seal between said glass housing and said ring being at one end of the ring only and the remainder of the ring extending substantially beyond the end of said housing, a terminal cap hermetically secured to said metal ring, a choke coil within said housing mounted on a tubular support of electrically nonconductive material, said protective housing being hermetically sealed to said tubular support at both ends of said choke coil, by means of said metal ring and said terminal cap, and an iron core within said tubular support adjustable in its position from one end of the choke coil to at least the mid-point thereof, whereby the inductance of said hermetically sealed-in choke coil can be regulated.

2. A hermetically sealed-in choke coil, comprising in combination, a protective elongated glass envelope, a choke coil within said envelope mounted on a tubular support of electrically nonconductive material, a closure mounting at each end of said envelope consisting of a tubular metal ring sealed directly to said elongated glass envelope at the inside thereof, the seal between said envelope and said ring being at one end of the ring only and the remainder of the ring extending substantially beyond the end of said envelope, and a terminal cap hermetically secured to said metal ring, wherein the said tubular support projects through each of said terminal caps and is hermetically secured thereto, electrical leads connected to said choke coil and said closure mounting, the glass of said elongated envelope and the metal of said ring having approximately the same temperature coefficient of expansion, and an iron core within said tubular support adjustable in its position from one end of the choke coil to at least the mid-point thereof.

3. A sealed-in choke coil comprising in combination a protective glass housing, a closure mounting at each end of said glass housing comprising a tubular metal ring having approximately the same coefficient of expansion as the glass housing and being sealed directly to said glass housing at the inside thereof, the seal between said glass housing and said ring being at one end of the ring only and the remainder of the ring extending substantially beyond the end of said housing, a terminal cap hermetically secured to said metal ring, a choke coil within said housing mounted on a tubular support of electrically non-conductive material, said protective housing being hermetically sealed to said tubular support at both ends of said choke coil by means of said metal ring and said terminal cap, and an iron core within said tubular support.

FRANKLIN CLARK.

REFERENCES CITED

The following references are of record in the file of this patent:

UNITED STATES PATENTS

| Number | Name | Date |
|---|---|---|
| 1,564,690 | Kruh | Dec. 8, 1925 |
| 1,633,047 | St. James | June 21, 1927 |
| 1,802,371 | Bullivant et al. | Apr. 28, 1931 |
| 2,176,064 | Cole | Oct. 17, 1939 |
| 2,228,087 | Rose | Jan. 7, 1941 |
| 2,250,986 | Dobke | July 29, 1941 |
| 2,279,831 | Lempert | Apr. 14, 1942 |
| 2,383,973 | Jones | Sept. 4, 1945 |
| 2,402,030 | Dorris | June 11, 1946 |

FOREIGN PATENTS

| Number | Country | Date |
|---|---|---|
| 521,604 | Great Britain | May 27, 1940 |